G. MITRO.
VEHICLE WHEEL.
APPLICATION FILED JAN. 2, 1919.

1,306,921.

Patented June 17, 1919.
3 SHEETS—SHEET 2.

Witnesses,
Mary A. Inglas
Augustus B. Coppers

INVENTOR
George Mitro
BY
Joshua R. H. Potts
his ATTORNEY

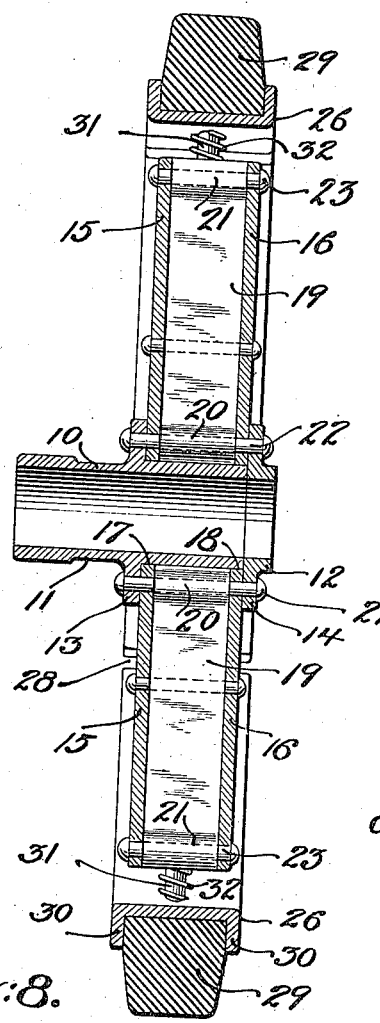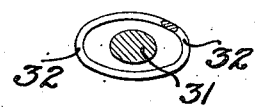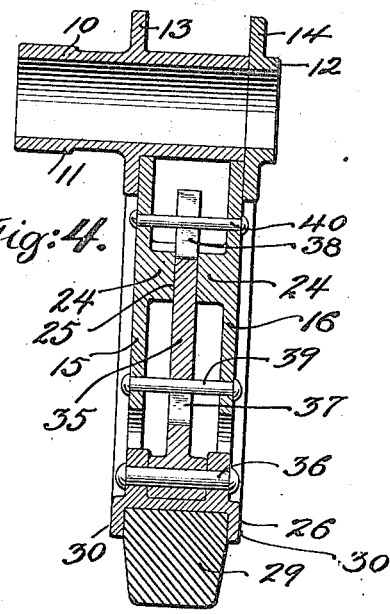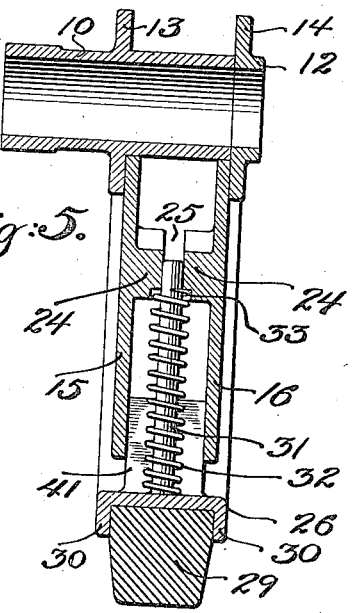

UNITED STATES PATENT OFFICE.

GEORGE MITRO, OF DARBY, PENNSYLVANIA.

VEHICLE-WHEEL.

1,306,921.

Specification of Letters Patent.  Patented June 17, 1919.

Application filed January 2, 1919.  Serial No. 269,229.

*To all whom it may concern:*

Be it known that I, GEORGE MITRO, a subject of the King of Hungary, residing at Darby, in the county of Delaware and State of Pennsylvania, have invented certain new and useful Improvements in Vehicle-Wheels, of which the following is a specification.

One object of my invention is to provide a vehicle wheel which will be strong and durable and which will efficiently absorb shocks received by encountering irregularities in the roadway and prevent them from being transferred to the vehicle body.

Another object is to so construct my improved wheel that the parts of it can be easily made and assembled.

These objects, and other advantageous ends which will be hereinafter described, I attain in the following manner, reference being had to the accompanying drawings in which—

Figure 1:
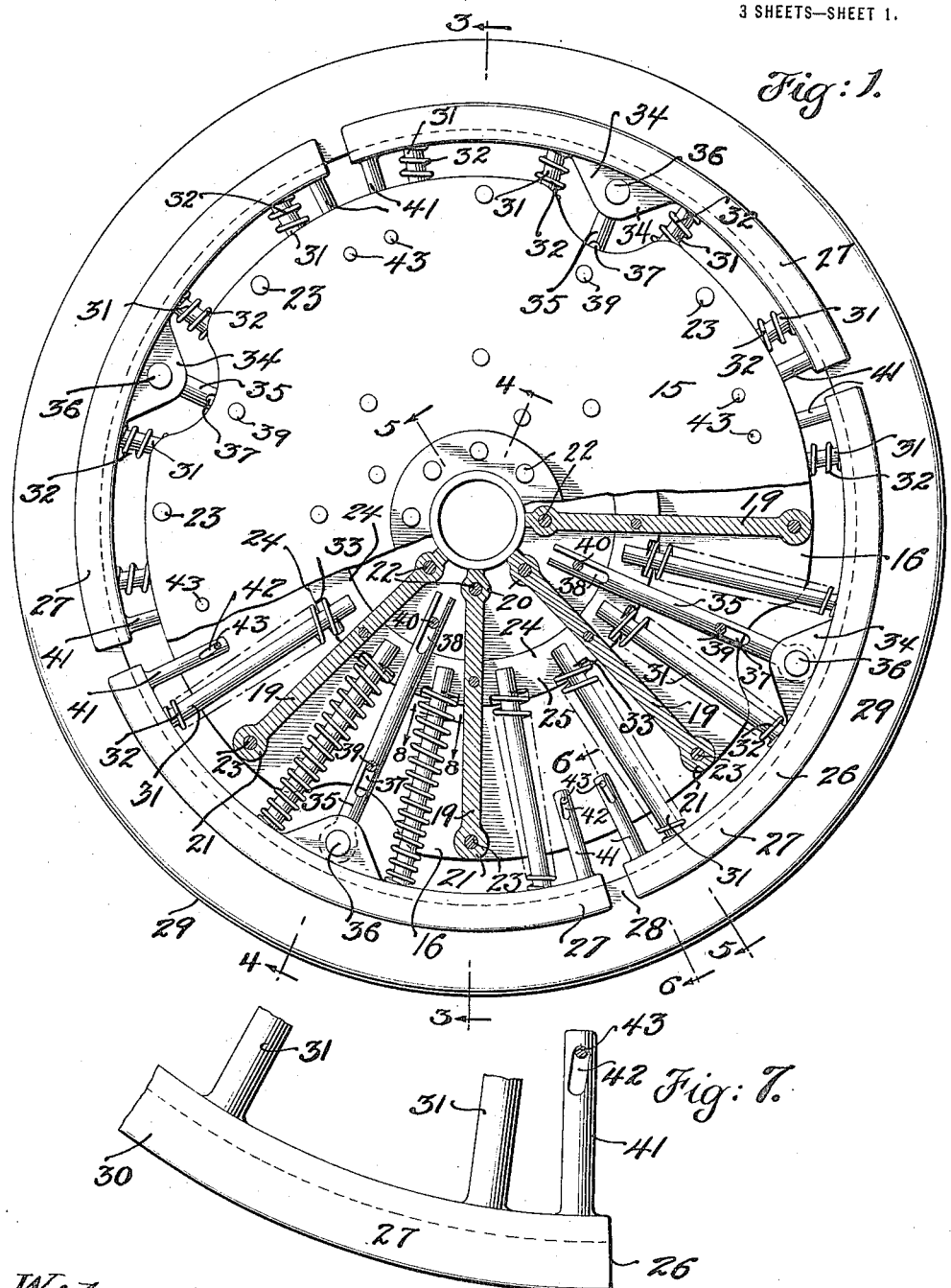
Figure 2:
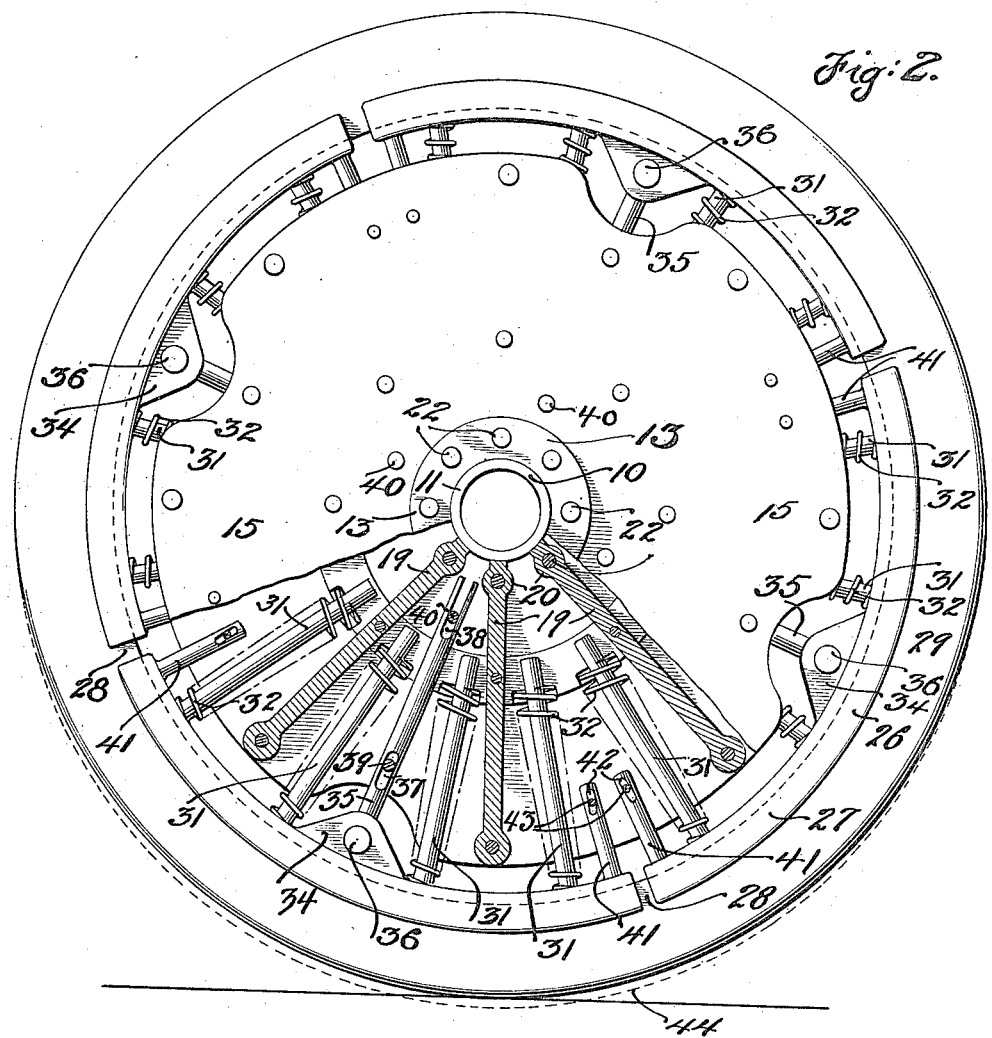
Figure 6:
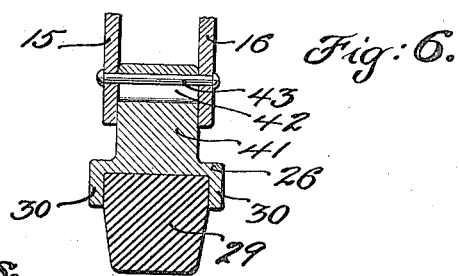

Figure 1 is a side elevation, partly broken away and in section, illustrating my improved wheel under normal conditions and when it is not supporting a load, Fig. 2 is a view of similar character to that shown in Fig. 1 but showing the wheel as it appears when supporting a load, Fig. 3 is a sectional view taken on the line 3—3 of Fig. 1, Fig. 4 is a sectional view taken on the line 4—4 of Fig. 1, Fig. 5 is a sectional view taken on the line 5—5 of Fig. 1, Fig. 6 is a fragmentary sectional view taken on the line 6—6 of Fig. 1, Fig. 7 is an enlarged fragmentary elevation of one of the parts of my improved wheel, and Fig. 8 is a fragmentary section taken on the line 8—8 of Fig. 1.

Referring to the drawings, 10 represents the hub of my improved wheel which is made in two sections 11 and 12. The section 11 provides an annular flange 13 and the section 12 provides an annular flange 14, as clearly shown in Fig. 3. The flanges 13 and 14 are spaced apart and two side disks 15 and 16 are mounted between them and have holes 17 and 18 through which the cylindrical portion of the hub 10 extends. The disks 15 and 16 are preferably made of strong metallic plates and between these disks are mounted a plurality of metallic bars or spokes 19. The spokes 19 fill the space between the disks 15 and 16 and each of the spokes at its opposite ends is provided with bosses or enlargements 20 and 21 through which extend rivets 22 and 23. The rivets 22 also extend through the disks 15 and 16 and the flanges 13 and 14 while the rivets 23 extend through the disks 15 and 16 only. Thus the spokes 19 and disks 15 and 16 are secured together and to the hub 10. The spokes 19 extend radially, as clearly shown in Figs. 1 and 2 and each of the disks 15 and 16 is provided with a plurality of inwardly extending lugs 24, as clearly shown in Figs. 1, 4 and 5. The lugs 24 in elevation are arcuate in shape and arranged in circular formation concentric to the axis of the hub. The inner surfaces of the lugs 24 do not touch but on the contrary provide a space 25 which produces a guide or slideway for certain elements hereinafter described.

A rim 26 is made in a number of sectoral sections 27 which are spaced apart as shown at 28. The tire 29 is made continuous and, as illustrated, of solid rubber and fits between the side flanges 30 of said rim 26. Each of the sections 27 of the rim is provided with a number of inwardly extending rods 31 and a coiled cushion or compressed spring 32 incloses each of these rods and has its opposite ends bearing on the rim sections and within a recess 33 provided by the lugs 24. These springs 32 are elliptical in cross section, as clearly shown in Fig. 8, to provide movement sidewise for the rods 31 during the operation of the wheel. Each of the sections 27 has a pair of inwardly extending ears 34 which are spaced apart and between each pair of ears is mounted one end of an anchoring bar 35, said end being pivotally connected by a pivot pin 36. The bars 35 are thus hinged to their respective sections. Each of the bars 35 has a slot 37 within its length and a notch 38 at its inner end. Pins 39 and 40 respectively pass through the slots 37 and notches 38 and also through the disks 15 and 16.

Each of the sectoral sections 27 of the rim 26 is provided at its ends with fingers 41 which have slots 42 therein. Pins 43 extend through the slots 42 and are secured within the disks 15 and 16 (see Figs. 1, 6 and 7). The pins 43 are preferably made of less diameter than the widths of the slots 42 to permit the sectoral sections to swing on their hinges provided by the pivots 36 and also to permit the sectoral sections to move bodily inward toward the axis of the hub.

Fig. 1 shows the parts in their normal position and Fig. 2 shows the parts moved relatively to each other in positions which they would occupy if the wheel were supporting a load, the relative change in movement being indicated by the dotted line 44 which represents the normal line of the wheel tire and it will be noted that the lowermost sections have been moved inwardly with relation to the disks 15 and 16, the springs 32 being compressed and forming interposed cushions.

The space 25, as previously stated, provides guideways both for the bars 35 and rods 31. The springs 32, being elliptical in cross section, permit sufficient sidewise movement of the rods 31 from the sectoral position, as shown in Fig. 1, to that indicated in Fig. 2, this movement being necessary during the operation of the wheel.

While I have described my invention as taking a particular form, it will be understood that the various parts of my invention may be changed without departing from the spirit thereof, and hence I do not limit myself to the precise construction set forth but consider that I am at liberty to make such changes and alterations as fairly come within the scope of the appended claims.

Having thus described my invention, what I claim as new and desire to secure by Letters Patent is:

1. A vehicle wheel including a hub and a rim; resilient means interposed between the rim and the hub; bars hinged to the rim; side portions secured to said hub and between which said bars are positioned; and means slidably anchoring said bars to the side portions whereby the rim is permitted relative movement toward and from the hub against the tension of said resilient means; said rim being made in sections, each of said sections having portions movably secured between said side portions and operative to limit the hinging movement of said rim sections; substantially as described.

2. A vehicle wheel including a hub and a rim; resilient means interposed between the rim and the hub; bars hinged to the rim; side portions secured to said hub and between which said bars are positioned; means slidably anchoring said bars to the side portions whereby the rim is permitted relative movement toward and from the hub against the tension of said resilient means; said rim being made in sections, each of said sections having portions at opposite sides of the respective hinges extending between said side portions and having slots therein; and means extending through said slots and secured to said side portions whereby the hinging movement of said rim sections is limited; substantially as described.

3. A vehicle wheel including a hub and a sectional rim; side portions secured to said hub and having inwardly extending lugs, the inner surfaces of said lugs being spaced apart to provide a slideway; rods secured to said rim sections and extending into said slideway; cushion springs surrounding said rods and bearing upon said lugs and said rim sections; and means for anchoring said sections relatively to said hub but permitting movement of said rim sections against the cushioning action of said springs; substantially as described.

4. A vehicle wheel including a hub and a sectional rim; side portions secured to said hub and having inwardly extending lugs, the inner surfaces of said lugs being spaced apart to provide a slideway; rods secured to the rim sections and extending into said slideway; cushion springs surrounding said rods and bearing upon said lugs and said rim sections; and means for anchoring said sections relatively to said hub but permitting movement of said rim sections against the cushioning action of said springs; said lugs having recesses in which the inner ends of said springs fit to hold said inner ends of the springs in position; substantially as described.

In testimony whereof I have signed my name to this specification in the presence of two subscribing witnesses.

GEORGE MITRO.

Witnesses:
CHAS. E. POTTS,
MARY A. INGLAR.